United States Patent
Marzorati et al.

(10) Patent No.: US 12,033,656 B2
(45) Date of Patent: Jul. 9, 2024

(54) DIARISATION AUGMENTED REALITY AIDE

(71) Applicant: KYNDRYL, INC., New York, NY (US)

(72) Inventors: Mauro Marzorati, Lutz, FL (US); Raghuram Srinivasan, Aurora, IL (US); Sarbajit K. Rakshit, Kolkata (IN); Jeremy R. Fox, Georgetown, TX (US)

(73) Assignee: KYNDRYL, INC., New York, NY (US)

( * ) Notice: Subject to any disclaimer, the term of this patent is extended or adjusted under 35 U.S.C. 154(b) by 461 days.

(21) Appl. No.: 17/352,284

(22) Filed: Jun. 19, 2021

(65) Prior Publication Data

US 2022/0406327 A1 Dec. 22, 2022

(51) Int. Cl.
*G10L 21/00* (2013.01)
*G02B 27/00* (2006.01)
(Continued)

(52) U.S. Cl.
CPC .......... *G10L 21/10* (2013.01); *G02B 27/0093* (2013.01); *G02B 27/0101* (2013.01);
(Continued)

(58) Field of Classification Search
CPC . G06T 15/205; G06T 15/1822; G06T 19/006; G06T 2215/16; G10L 15/1822;
(Continued)

(56) References Cited

U.S. PATENT DOCUMENTS 4,980,926 A 12/1990 Noetzel
5,806,036 A * 9/1998 Stork .................... H04M 1/271
704/271
(Continued)

FOREIGN PATENT DOCUMENTS

CN 206179323 U 5/2017
CN 105073073 B 12/2018
(Continued)

OTHER PUBLICATIONS

Siri Eksvärd et al."Evaluating Speech-to-Text Systems and AR-glasses: A Study to Develop a Potential Assistive Device for People With Hearing Impairments", Feb. 2021.

*Primary Examiner* — Edgar X Guerra-Erazo
(74) *Attorney, Agent, or Firm* — Erik Swanson; Andrew D. Wright; Calderon Safran & Wright P.C.

(57) ABSTRACT

An image of a real-world environment including one or more users, is received from an image capture device. A mask status of a first user of is determined by a processor based on the image. A stream of audio including speech from one or more users is captured from one or more audio transceivers. A first user speech from the stream of audio identified by the processor. The stream of audio is parsed, by the processor and based on the first user speech and based on an audio processing technique, to create a first user speech element. An augmented view that includes the first user speech element is generated, for a wearable computing device, based on the first user speech and based on the mask status.

20 Claims, 5 Drawing Sheets

(51) Int. Cl.
*G02B 27/01* (2006.01)
*G06N 3/08* (2023.01)
*G06T 15/20* (2011.01)
*G06T 19/00* (2011.01)
*G10L 15/18* (2013.01)
*G10L 21/10* (2013.01)

(52) U.S. Cl.
CPC ............ *G02B 27/017* (2013.01); *G06N 3/08* (2013.01); *G06T 15/205* (2013.01); *G06T 19/006* (2013.01); *G10L 15/1822* (2013.01); *G02B 2027/0138* (2013.01); *G06T 2215/16* (2013.01)

(58) Field of Classification Search
CPC ... G10L 15/22; G10L 25/78; G10L 2015/227; H04R 1/083; H04R 2420/07; H04R 2499/11; H04K 3/825; H04K 3/68; H04K 2203/16; H04K 2203/12; H04K 2203/14
See application file for complete search history.

(56) References Cited

U.S. PATENT DOCUMENTS

| | | | | |
|---|---|---|---|---|
| 6,185,529 | B1 * | 2/2001 | Chen | G10L 15/25 704/251 |
| 6,471,420 | B1 * | 10/2002 | Maekawa | G10L 15/25 704/250 |
| 6,997,178 | B1 * | 2/2006 | Reynaud | A62B 18/08 128/201.19 |
| 7,974,714 | B2 | 7/2011 | Hoffberg | |
| 8,437,491 | B2 * | 5/2013 | Ward | H04R 1/083 381/376 |
| 9,143,839 | B2 | 9/2015 | Reisman | |
| 9,875,406 | B2 | 1/2018 | Haddick et al. | |
| 10,878,824 | B2 * | 12/2020 | Carpenter, II | G10L 17/06 |
| 11,160,319 | B1 * | 11/2021 | Witchey | A62B 18/08 |
| 2002/0166557 | A1 * | 11/2002 | Cooper | H04R 1/46 128/206.28 |
| 2004/0243416 | A1 * | 12/2004 | Gardos | G10L 15/25 704/275 |
| 2005/0172968 | A1 * | 8/2005 | Hishida | A62B 23/025 128/205.25 |
| 2008/0089546 | A1 * | 4/2008 | Ward | H04R 1/083 381/376 |
| 2008/0092897 | A1 | 4/2008 | Behm et al. | |
| 2015/0279227 | A1 * | 10/2015 | Huber | G09B 7/06 434/353 |
| 2017/0178356 | A1 * | 6/2017 | Bhuruth | G06T 13/00 |
| 2017/0364509 | A1 * | 12/2017 | Cordell | H04L 67/561 |
| 2018/0168781 | A1 | 6/2018 | Kopelman et al. | |
| 2020/0094416 | A1 * | 3/2020 | Park | G06F 3/167 |
| 2020/0311475 | A1 * | 10/2020 | el Kaliouby | G06V 20/593 |
| 2020/0350057 | A1 * | 11/2020 | el Kaliouby | G16H 40/67 |
| 2021/0188291 | A1 * | 6/2021 | el Kaliouby | G16H 20/70 |
| 2021/0373850 | A1 * | 12/2021 | Shah | H04R 1/46 |
| 2022/0059077 | A1 * | 2/2022 | Thomson | G10L 25/51 |
| 2022/0126201 | A1 * | 4/2022 | Ma | H04L 65/1059 |
| 2022/0223145 | A1 * | 7/2022 | Amman | G10L 15/07 |
| 2022/0279874 | A1 * | 9/2022 | Bergman | G10L 15/26 |
| 2022/0343934 | A1 * | 10/2022 | Lynch | G10L 21/034 |
| 2023/0033776 | A1 * | 2/2023 | el Kaliouby | G16H 30/40 |

FOREIGN PATENT DOCUMENTS

| | | | | |
|---|---|---|---|---|
| CN | 114995927 A | * | 9/2022 | |
| IN | 202041049952 A | | 11/2020 | |
| JP | 2000176033 A | | 6/2000 | |
| JP | 6068329 B2 | | 1/2017 | |
| WO | WO-2020005563 A1 | * | 1/2020 | ............ A63F 13/87 |
| WO | 2020261148 A1 | | 12/2020 | |

* cited by examiner

DIARISATION AUGMENTED REALITY AIDE

BACKGROUND

The present disclosure relates to augmented reality, and more specifically, to utilizing augmented reality to assist in understanding individuals.

Individuals may wear masks for a variety of reasons. An individual may wear a mask to protect them from various airborne and or droplet-based diseases. An individual may wear a mask to protect others from various diseases. A mask may be worn to assist in stopping the spread of various diseases that may otherwise not be able to be stopped through other means, such as vaccinations or socially distancing. The mask may be effective in that it blocks the mouth and/or nose of the wearing individual (e.g., prevent others from viewing the mouth and/or nose of an individual).

SUMMARY

According to embodiments, disclosed are a method, system, and computer program product.

An image of a real-world environment that includes one or more users is received from an image capture device. A mask status of a first user of the one or more users is determined by a processor and based on the image. A stream of audio that includes speech from the one or more users is captured from one or more audio transceivers. A first user speech from the stream of audio identified by the processor and based on the stream of audio. The stream of audio is parsed by the processor, and based on the first user speech and an audio processing technique, to create a first user speech element. An augmented view is generated based on the first user speech and based on the mask status. The augmented view includes the first user speech element. The augmented view is generated for a wearable computing device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
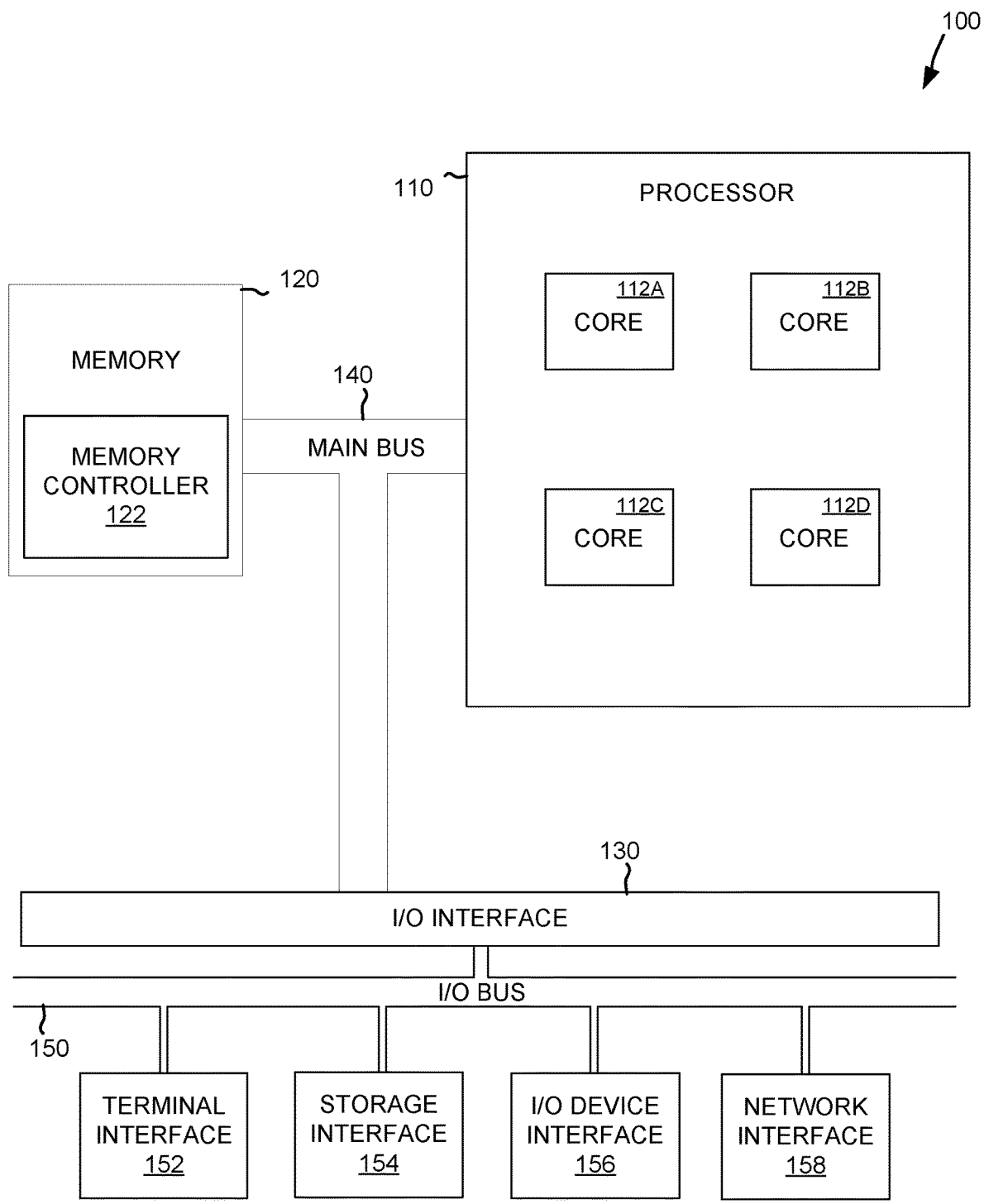
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to augmented reality, and more particular aspects relate to utilizing augmented reality to assist in understanding users. While the present disclosure is not necessarily limited to such applications, various aspects of the disclosure may be appreciated through a discussion of various examples using this context.

Certain diseases may be transmitted through the air, and through the breathing of various individuals, such as various bacteria, fungus, viruses, or other pathological microorganisms. Specifically, certain diseases may be transmitted through particular matter that travels in the air. These diseases may be droplet-based, such as contained in aqueous bodies that are near or above five microns in size. Other of these diseases may be aerosolized transmissions that are near or below five microns in size. These diseases may spread between humans in a variety of scenarios, such as through the breath of multiple individuals as they are indoors, outdoors, or when many individuals are gathering in an enclosed space. For example, users using public transportation may gather together inside of a vehicle. In another example, users may gather into a restaurant to eat and socialize together. In yet another example, many users may work and/or reside in large buildings that have climate control systems that recirculate air and adjust the temperature and humidity. The climate control systems may transmit the air throughout the large buildings causing the spread of disease.

Increasingly, individuals may wear protective equipment, such as masks or other relevant face coverings. The masks may facilitate the protection of individuals from the airborne and droplet-based diseases. For example, an individual may be protected from infection by wearing a certain type of mask (e.g., an N95 mask). In another example, the wearing of a mask by an individual that is suffering from a disease may assist in stopping the spread (e.g., a mask may be able to trap small particles from a user suffering from Tuberculosis). Masks are also increasingly popular because they are easy to use. For example, users may learn how to wear a mask without any advanced training or from a relative or family member.

Another rationale for the widespread use of masks is that of the relatively low cost to implement and use masks. For instance, masks may be made of lightweight material that is relatively inexpensive and may transport easily, such as cotton or other common textiles. In addition, masks may become popular at times of widespread disease, such as during a yearly outbreak of nasopharyngitis or rhinoviruses (alternatively, the common cold). The inexpensive and relatively easy to adopt mask, may provide for society to operate with minor inconveniences compared to other techniques to reduce the spread of diseases. For example, vaccinations may take many weeks, months, or years to develop and test for safety and efficacy against diseases. In other instances, socially distancing from other individuals may be impractical, as certain individuals may need to interact with each other, such as during operations of fundamental or needed services (e.g., food and shelter related business).

While masks may be one of the best ways to oppose the spread of certain disease, masks may have certain drawbacks for a variety of users. Many users may be unable to understand or comprehend a user that speaks while wearing a mask. For instance, people who have hearing impairments may leverage their visual acuity to compensate for their auditory deficiency. These hearing-impaired users may comprehend other individuals by visually studying the faces, and specifically the mouth of those around them; sometimes referred to as reading lips. Conventional face masks, by their very name, mask or obstruct the view respiratory orifices on a face, namely the nose and mouth.

Transparent face masks exist that may ameliorate the lack of hearing-impaired individuals to communicate with wearers of face masks, but they too have drawbacks. Transparent face masks may not be readily available to most users, or may be limited to very specific situations, such as operating rooms. However, in uncontrolled situations, such as general-purpose social interactions, a transparent face mask may be more costly or not as easily able to be obtained by a wearer and may rely on a wearer to take extra steps for the benefit of others. Further, transparent face masks may be ecologically inferior to other masks. Specifically, a transparent face mask may rely on a hard-to-recycle plastic film and/or more complicated multi-component assembly processes. Transparent facemasks, consequently, may not be readily available to be adopted by large swaths of the population of mask wearers. The lack of adoption of transparent masks may leave hearing-impaired individuals at a disadvantage to comprehend and communicate in social distancing or general settings of everyday life.

A diarisation augmented reality aide ("DARA") may provide advantages for individuals to communicate with and/or comprehend mask wearing individuals. The DARA may leverage the computing and/or processing power of a wearable computing device. A wearable computing device may be a computer or series of computers that are worn on the body of a person (alternatively, a "wearer"). A wearable computing device may be integrated into a garment, glasses, necklaces, rings, wrist bands, watches, head bands, and the like. The DARA may operate by generating an augmented view of a real-world environment for the wearer that includes the speech of users in the environment. For example, the DARA may provide to an augmented reality ("AR") headset or AR glasses an augmented viewpoint of the user that includes the speech of users.

The DARA may perform processing to identify various subjects in the view of an environment of the wearer. Specifically, the DARA may be configured to detect a mask or determine a mask status of one or more users and/or the masks worn by one or more users in the environment that are in view of the user. The DARA may use the mask status to determine whether a user is attempting to communicate. The DARA may also use the mask status to generate the augmented view. In some embodiments, the DARA may be configured to also detect or determine whether a user is looking at the wearer, such as an eye contact status. For example, the DARA may be configured to analyze an image captured from a wearable computing device (such as AR glasses) to determine that a particular user is looking at a wearer. Further, the DARA may perform processing to identify various speech, parts of speech, and/or talking of user, such as by performing audio processing on the speech. For example, the DARA may be configured to perform one or more triangulation techniques on audio signals to identify and/or pinpoint a specific location as a source of speech. In another example, the DARA may be configured to perform natural language processing to determine words and sentences of the user.

The DARA may be configured to perform one or more computer operations and/or technique to provide a representation and/or reproduction of audio to a user in a manner that makes sense and is coherent with normal speech and communication of two users (e.g., a conversation, portions of a conversation). For instance, the DARA may be configured to take speech that is identified by one or more natural language processing, word identification, machine learning, or other relevant speech recognition technologies, and perform diarisation on the speech of a user. Diarisation (or speaker diarisation) may include one or more processes or operations to partition an audio stream that includes one or more users speaking and other sounds into relevant segments. These segments or speech elements may include homogeneous segments, sentences, utterances, or other relevant portions of speech associated with a particular identity (e.g., the speech of a single user). The DARA may include the performance of one or more processing or other relevant computer operations (e.g., machine learning), to produce speech that is more easily comprehendible by a user. The more comprehendible speech may include speech that is structured on the basis of segments and clusters of a user. In detail, the DARA may perform a processing on a speech to text output. The speech to text output may be segmented into logical segments, such as utterances, words, phrases, or other relevant portions. Further, the relevant portions may then be clustered into relevant groupings or clusters, such as thoughts, ideas, or other relevant communications. The groupings or clusters may be performed based on identifying particular characteristics of a user, such as a semantic meaning of the user or a particular communication of an idea of a user.

The DARA may use the output of the speech recognition and/or speech diarisation to generate an augmented view or output for a user. For instance, the DARA may parse the speech into particular subsets or portions that are displayable by a display of an AR device or other relevant wearable computing device. The DARA may perform image processing to identify a particular portion of the real-world environment that is low-information density. For example, the DARA may perform a machine learning technique, to identify that a portion of a view of the wearer includes a mask of a user that was speaking to the wearer. Further, the DARA may generate an augmented view where the speech of the user that was speaking to the user appears to cover or overlay the mask. Alternatively, the DARA may identify that the area just above the eyes of the user is a location of low information density, and responsively, the DARA may generate an augmented view where the speech is located above the eyes of the user.

The DARA may provide benefits to individuals that are having difficulty understanding mask wearers. For example, a wearer of a wearable computing device may have trouble understanding users that are wearing a mask due to being deaf or experiencing another hearing impairment. In another example, a wearer of a wearable computing device may be exposed to loud noises, such as by using public transportation, and may not be able to understand users that are wearing a mask with the loud noises. The DARA may process the environment of the wearer and may generate an augmented view for the wearable computing device that integrates a diarized augmented view for the wearer. Consequently, the wearer may be able to participate in conversations and successfully communicate without masked users needing to speak up, wear a special kind of mask, or temporarily remove the mask. In some situations, the DARA may reduce the cognitive load of a wearer, by performing speech recognition and diarisation such that the wearer does not need to perform lip reading.

The DARA may uniquely increase the information density of the field of view, so it does not interfere with other areas where visual information is sourcing from. People with auditory deficiencies may rely more on other senses for perception of the world, and the DARA may provide textual information to a wearable computing device without removing the ability of the wearer to perceive the other non-verbal information in an environment. For example, face masks or other coverings may provide an area of low-density visual information; an area that a user may not utilize to determine much visual information.

The DARA may also increase the quality of speech-to-text for a wearer of a wearable computing device. For instance, the DARA may selectively perform speech recognition and diarisation only on individuals that are speaking with a face covering, and that are looking at or directing speech to the wearer. Consequently, the DARA may reduce the amount of irrelevant or non-important text that is recognized and visualized to the user. This increased speech-to-text signal to noise ratio by the DARA, may reduce the cognitive burden of a wearer. Further, the reduced amount of speech-to-text processing may reduce the burden on any computing device that is performing a relevant speech-to-text algorithm, reduced processing power or memory usage.

The DARA may also continually adjust the size and shape of the overlay in an augmented view such that, to a wearer of a wearable computing device, the apparent size and shape match an area of low information density. For example, as a user moves closer and farther within an augmented view, the mask or other portion of low information density appears larger and smaller, and the DARA responsively adjusts the size and shape of the overlay or augmented speech element to be larger and smaller, respectively. The continued adjustment preserves the position of any augmented text and as a result, the data density of the remaining field of view (gestures, expressions) remains visible to a wearer.

The DARA may perform a location-based speech diarisation, in conjunction with preferences of a wearer. Specifically, the DARA may create, modify, and continuously update a corpus of data about a wearer that includes the location of the wearer and entities in the environment, such as individuals and relationships of individuals with the wearer. The DARA may utilize the corpus in conjunction with user-defined preferences about the type of speech diarisation that should be performed in various locations. The corpus and/or preferences may specify the speed, language, or formatting preferences that are based on a location preference. The variation in these formatting preferences may alter the speed and consumption quality based on the physical location of the wearer. For example, the consumption quality may be set to high, and so speed may be adjusted to make sure all formal information in speech of users is consumed with complete accuracy for a business specific conversation. In a second example, an airport may be a very noisy and busy environment, so the communication preferences may reflect that clarity is high but verbose text is low to ensure quick, but accurate consumption. In a third example, accuracy may not be as important in a home, so the DARA might use local abbreviates and nomenclature(s) specific to the environment or the other individuals in the environment.

Consequently, the DARA may provide advantages to various individuals having differing abilities to hear. By diarizing and adjusting to a view of the wearer of a wearable computing device, the DARA may increase the ability of a user to digest and participate in communication with other individuals.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

Figure 2:
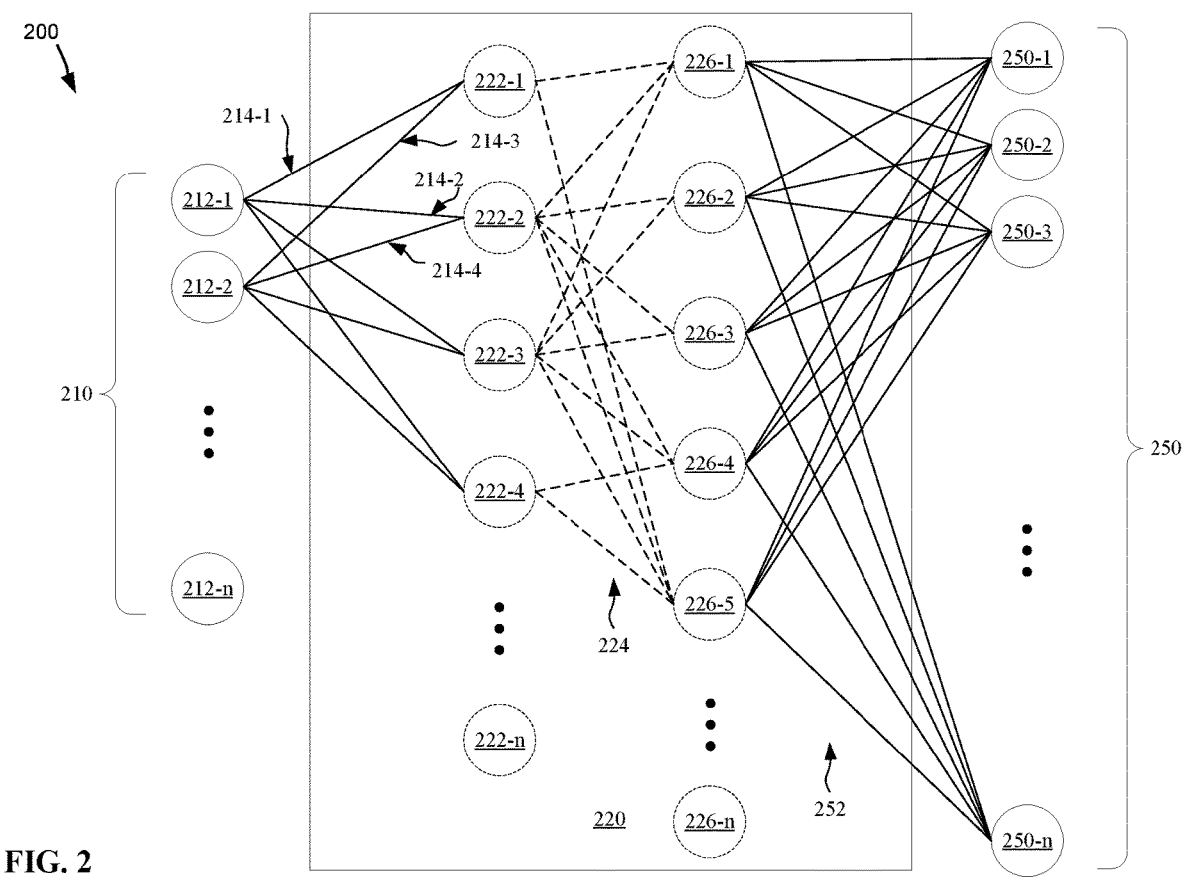
FIG. 2 depicts an example neural network representative of one or more artificial neural networks capable performing one or more operations of diarisation augmented reality aide ("DARA"), consistent with embodiments of the present disclosure.

FIG. 2 depicts an example neural network (alternatively, "network") 200 representative of one or more artificial neural networks capable performing DARA, consistent with embodiments of the present disclosure. The neural network 200 is made up of a plurality of layers. The network 200 includes an input layer 210, a hidden section 220, and an output layer 250. Though network 200 depicts a feed-forward neural network, it should be appreciated that other neural networks layouts may also be configured to diarisation, such as a recurrent neural network layout (not depicted). In some embodiments, the network 200 may be a design-and-run neural network and the layout depicted may be created by a computer programmer. In some embodiments, the network 200 may be a design-by-run neural network, and the layout depicted may be generated by the input of data and by the process of analyzing that data according to one or more defined heuristics. The network 200 may operate in a forward propagation by receiving an input and outputting a result of the input. The network 200 may adjust the values of various components of the neural network by a backward propagation (back propagation).

The input layer 210 includes a series of input neurons 212-1, 212-2, up to 212-$n$ (collectively, 212) and a series of input connections 214-1, 214-2, 214-3, 214-4, etc. (collectively, 214). The input layer 210 represents the input from data that the neural network is supposed to analyze (e.g., a digitized picture of a real-world environment, audio input received from a real-world environment, generation of an augmented view). Each input neuron 212 may represent a subset of the input data. For example, the neural network 200 is provided with one or more sound clips or segments of an audio stream, and the audio stream is broken into a plurality of sound samples, wherein sound sample is represented by a particular input neuron 212.

In another example, input neuron 212-1 may be the first pixel of a picture, input neuron 212-2 may be the second pixel of the picture, etc. The number of input neurons 212 may correspond to the size of the input. For example, when neural network 200 is designed to analyze images that are 256 pixels by 256 pixels, the neural network layout may include a series of 65,536 input neurons. The number of input neurons 212 may correspond to the type of input. For example when the input is a color image that is 256 pixels by 256 pixels, the neural network layout may include a series of 196,608 input neurons (65,536 input neurons for the red values of each pixel, 65,536 input neurons for the green values of each pixel, and 65,536 input neurons for the blue values of each pixel). The type of input neurons 212 may correspond to the type of input. In a first example, a neural network may be designed to analyze images that are black and white, and each of the input neurons may be a decimal value between 0.00001 and 1 representing the grayscale shades of the pixel (where 0.00001 represents a pixel that is completely white and where 1 represents a pixel that is completely black). In a second example, a neural network may be designed to analyze images that are color, and each of the input neurons may be a three dimensional vector to represent the color values of a given pixel of the input images (where the first component of the vector is a red whole-number value between 0 and 255, the second component of the vector is a green whole-number value between 0 and 255, and the third component of the vector is a blue whole-number value between 0 and 255).

The input connections 214 represent the output of the input neurons 212 to the hidden section 220. Each of the input connections 214 varies depending on the value of each input neuron 212 and based upon a plurality of weights (not depicted). For example, the first input connection 214-1 has a value that is provided to the hidden section 220 based on the input neuron 212-1 and a first weight. Continuing the example, the second input connection 214-2 has a value that is provided to the hidden section 220 based on the input neuron 212-1 and a second weight. Further continuing the example, the third input connection 214-3 based on the input neuron 212-2 and a third weight, etc. Alternatively stated, the input connections 214-1 and 214-2 share the same output component of input neuron 212-1 and the input connections 214-3 and 214-4 share the same output component of input neuron 212-2; all four input connections 214-1, 214-2, 214-3, and 214-4 may have output components of four different weights. Though the network neural 200 may have different weightings for each connection 214, some embodiments may contemplate weights that are similar. In some embodiments, each of the values of the input neurons 212 and the connections 214 may necessarily be stored in memory.

The hidden section 220 includes one or more layers that receive inputs and produce outputs. The hidden section 120 includes a first hidden layer of calculation neurons 222-1, 222-2, 222-3, 222-4, up to 222-$n$ (collectively, 222); a second hidden layer of calculation neurons 226-1, 226-2, 226-3, 226-4, 226-5, up to 226-$n$ (collectively 226); and a series of hidden connections 224 coupling the first hidden layer and the second hidden layer. It should be appreciated that neural network 200 only depicts one of many neural networks capable of one or more operations of DARA, consistent with some embodiments of the disclosure. Consequently, the hidden section 220 may be configured with more or less hidden layers (e.g., one hidden layer, seven hidden layers, twelve hidden layers, etc.)—two hidden layers are depicted for example purposes.

The first hidden layer 222 includes the calculation neurons 222-1, 222-2, 222-3, 222-4, up to 222-$n$. Each calculation neuron of the first hidden layer 222 may receive as input one or more of the connections 214. For example, calculation neuron 222-1 receives input connection 214-1 and input connection 214-2. Each calculation neuron of the first hidden layer 222 also provides an output. The output is represented by the dotted lines of hidden connections 224 flowing out of the first hidden layer 222. Each of the calculation neurons 222 performs an activation function during forward propagation. In some embodiments, the activation function may be a process of receiving several binary inputs, and calculating a single binary output (e.g., a perceptron). In some embodiments, the activation function may be a process of receiving several non-binary inputs (e.g., a number between 0 and 1, 0.671, etc.) and calculating a single non-binary output (e.g., a number between 0 and 1, a number between −0.5 and 0.5, etc.). Various functions may be performed to calculate the activation function (e.g., a sigmoid neurons or other logistic functions, tanh neurons, softplus functions, softmax functions, rectified linear units, etc.). In some embodiments, each of the calculation neurons 222 also contains a bias (not depicted). The bias may be used to decide the likelihood or valuation of a given activation function. In some embodiments, each of the values of the biases for each of the calculation neurons must necessarily be stored in memory.

The neural network 200 may include the use of a sigmoid neuron for the activation function of calculation neuron 222-1. An equation (Equation 1, stated below) may represent the activation function of calculation neuron 212-1 as f(neuron). The logic of calculation neuron 222-1 may be the summation of each of the input connections that feed into calculation neuron 222-1 (i.e., input connection 214-1 and input connection 214-3) which are represented in Equation 1 as j. For each j the weight w is multiplied by the value x of the given connected input neuron 212. The bias of the calculation neuron 222-1 is represented as b. Once each input connection j is summed the bias b is subtracted. Finalizing the operations of this example as follows: given a larger positive number of results from the summation and bias in activation f(neuron), the output of calculation neuron 222-1 approaches approximately 1; given a larger negative number of results from the summation and bias in activation f(neuron), the output of calculation neuron 222-1 approaches approximately 0; and given a number somewhere in between a larger positive number and a larger negative number of results from the summation and bias in activation f(neuron), the output varies slightly as the weights and biases vary slightly.

$$f(\text{neuron}) = \frac{1}{1 + \exp\left(-\sum_j w_j x_j - b\right)} \quad \text{Equation 1}$$

The second hidden layer 226 includes the calculation neurons 226-1, 226-2, 226-3, 226-4, 226-5, up to 226-$n$. In some embodiments, the calculation neurons of the second hidden layer 226 may operate similarly to the calculation neurons first hidden layer 222. For example, the calculation neurons 226-1 to 226-$n$ may each operate with a similar activation function as the calculation neurons 222-1 to 222-$n$. In some embodiments, the calculation neurons of the second hidden layer 226 may operate differently to the calculation neurons of the first hidden layer 222. For example, the calculation neurons 226-1 to 226-$n$ may have a first activation function, and the calculation neurons 222-1 to 222-$n$ may have a second activation function.

Similarly, the connectivity to, from, and between the various layers of the hidden section 220 may also vary. For example, the input connections 214 may be fully connected to the first hidden layer 222 and hidden connections 224 may be fully connected from the first hidden layer to the second hidden layer 226. In some embodiments, fully connected may mean that each neuron of a given layer may be connected to all the neurons of a previous layer. In some embodiments, fully connected may mean that each neuron of a given layer may function completely independently and may not share any connections. In a second example, the input connections 214 may not be fully connected to the first hidden layer 222 and the hidden connections 224 may not be fully connected from the first hidden layer to the second hidden layer 226.

Further, the parameters to, from, and between the various layers of the hidden section 220 may also vary. In some embodiments, the parameters may include the weights and the biases. In some embodiments, there may be more or less parameters than the weights and biases. For purposes of example, neural network 200 may be in the form of a convolutional neural network or convolution network. The convolutional neural network may include a sequence of heterogeneous layers (e.g., an input layer 210, a convolution layer 222, a pooling layer 226, and an output layer 250). In such a network, the input layer may hold the raw pixel data of an image in a 3-dimensional volume of width, height, and color. The convolutional layer of such a network may output from connections that are only local to the input layer to identify a feature in a small section of the image (e.g., an eyebrow from a face of a first subject in a picture depicting four subjects, a front fender of a vehicle in a picture depicting a truck, etc.). Given this example, the convolutional layer may include weights and biases, as well as, additional parameters (e.g., depth, stride, and padding). The pooling layers of such a network may take as input the output of the convolutional layers but perform a fixed function operation (e.g., an operation that does not take into account any weight or bias). Also given this example, the pooling layer may not contain any convolutional parameters and may also not contain any weights or biases (e.g., performing a down-sampling operation).

The output layer 250 includes a series of output neurons 250-1, 250-2, 250-3, up-to 250-$n$ (collectively, 250). The output layer 250 holds a result of the analyzation of the neural network 200. In some embodiments, the output layer 250 may be a categorization layer used to identify a feature of the input to the network 200. For example, the network 200 may be a classification network trained to identify Arabic numerals. In such an example, the network 200 may include ten output neurons 250 corresponding to which Arabic numeral the network has identified (e.g., output neuron 250-2 having a higher activation value than output neurons 250 may indicate the neural network determined an image contained the number '1'). In some embodiments, the output layer 250 may be a real-value target (e.g., trying to predict a result when an input is a previous set of results) and there may be only a singular output neuron (not depicted). The output layer 250 is fed from an output connection 252. The output connection 252 provides the activations from the hidden section 220. In some embodiments, the output connections 252 may include weights and the output neurons 250 may include biases.

Training the neural network depicted by neural network 200 may include performing back propagation. Back propagation is different from forward propagation. Forward propagation may include feeding of data into the input neurons 210; performing the calculations of the connections 214, 224, 252; and performing the calculations of the calculation neurons 222 and 226. The forward propagation may also be the layout of a given neural network (e.g., recurrence, number of layers, number of neurons in one or more layers, layers being fully connected or not to other layers, etc.). Back propagation may be used to determine an error of the parameters (e.g., the weights and the biases) in the network 200 by starting with the output neurons 250 and propagating the error backward through the various connections 252, 224, 214 and layers 226, 222, respectively.

Back propagation includes performing one or more algorithms based on one or more training data to reduce the difference between what a given neural network determines from an input and what the given neural network should determine from the input. The difference between a network determination and the correct determination may be called the objective function (alternatively, the cost function). When a given neural network is initially created and data is provided and calculated through a forward propagation the result or determination may be an incorrect determination. For example, neural network 200 may be a classification network; may be provided with a 128 pixel by 250 pixel image input that contains the number '3'; and may determine that the number is most likely '9' and is second most likely '2' and is third most likely '3' (and so on with the other Arabic numerals). Continuing the example, performing a back propagation may alter the values of the weights of connections 214, 224, and 252; and may alter the values of the biases of the first layer of calculation neurons 222, the second layer of calculation neurons 226, and the output neurons 250. Further continuing the example, the performance of the back propagation may yield a future result that is a more accurate classification of the same 128 pixel by 250 pixel image input that contains the number '3' (e.g., more closely ranking '9', '2', then '3' in order of most likely to least likely, ranking '9', then '3', then '2' in order of most likely to least likely, ranking '3' the most likely number, etc.).

Equation 2 provides an example of the objective function ("example function") in the form of a quadratic cost function (e.g., mean squared error)—other functions may be selected, and the mean squared error is selected for example purposes. In Equation 2, all of the weights may be represented by w and biases may be represented by b of neural network 200. The network 200 is provided a given number of training inputs n in a subset (or entirety) of training data that have input values x. The network 200 may yield output a from x and should yield a desired output y(x) from x. Back propagation or training of the network 200 should be a reduction or minimization of the objective function 'O(w,b)' via alteration of the set of weights and biases. Successful training of network 200 should not only include the reduction of the difference between the answer a and the correct answers y(x) for the input values x, but given new input values (e.g., from additional training data, from validation data, etc.).

$$O(w, b) \equiv \frac{1}{2n}\sum_x \|y(x) - a\|^2 \qquad \text{Equation 2}$$

Many options may be utilized for back propagation algorithms in both the objective function (e.g., mean squared error, cross-entropy cost function, accuracy functions, confusion matrix, precision-recall curve, mean absolute error, etc.) and the reduction of the objective function (e.g., gradient descent, batch-based stochastic gradient descent, Hessian optimization, momentum-based gradient descent, etc.). Back propagation may include using a gradient descent algorithm (e.g., computing partial derivatives of an objective function in relation to the weights and biases for all of the training data). Back propagation may include determining a stochastic gradient descent (e.g., computing partial derivatives of a subset the training inputs in a subset or batch of training data). Additional parameters may be involved in the various back propagation algorithms (e.g., the learning rate for the gradient descent). Large alterations of the weights and biases through back propagation may lead to incorrect training (e.g., overfitting to the training data, reducing towards a local minimum, reducing excessively past a global minimum, etc.). Consequently, modification to objective functions with more parameters may be used to prevent incorrect training (e.g., utilizing objective functions that incorporate regularization to prevent overfitting). Also consequently, the alteration of the neural network 200 may be small in any given iteration. Back propagation algorithms may need to be repeated for many iterations to perform accurate learning as a result of the necessitated smallness of any given iteration.

For example, neural network 200 may have untrained weights and biases, and back propagation may involve the stochastic gradient descent to train the network over a subset of training inputs (e.g., a batch of 10 training inputs from the entirety of the training inputs). Continuing the example, network 200 may continue to be trained with a second subset of training inputs (e.g., a second batch of 10 training input from the entirety other than the first batch), which can be repeated until all of the training inputs have been used to calculate the gradient descent (e.g., one epoch of training data). Stated alternatively, if there are 10,000 training images in total, and one iteration of training uses a batch size of 100 training inputs, 1,000 iterations would be needed to complete an epoch of the training data. Many epochs may be performed to continue training of a neural network. There may be many factors that determine the selection of the additional parameters (e.g., larger batch sizes may cause improper training, smaller batch sizes may take too many training iterations, larger batch sizes may not fit into memory, smaller batch sizes may not take advantage of discrete GPU hardware efficiently, too little training epochs may not yield a fully trained network, too many training epochs may yield overfitting in a trained network, etc.). Further, network 200 may be evaluated to quantify the performance of evaluating a dataset, such as by use of an evaluation metric (e.g., mean squared error, cross-entropy cost function, accuracy functions, confusion matrix, precision-recall curve, mean absolute error, etc.).

Figure 3:
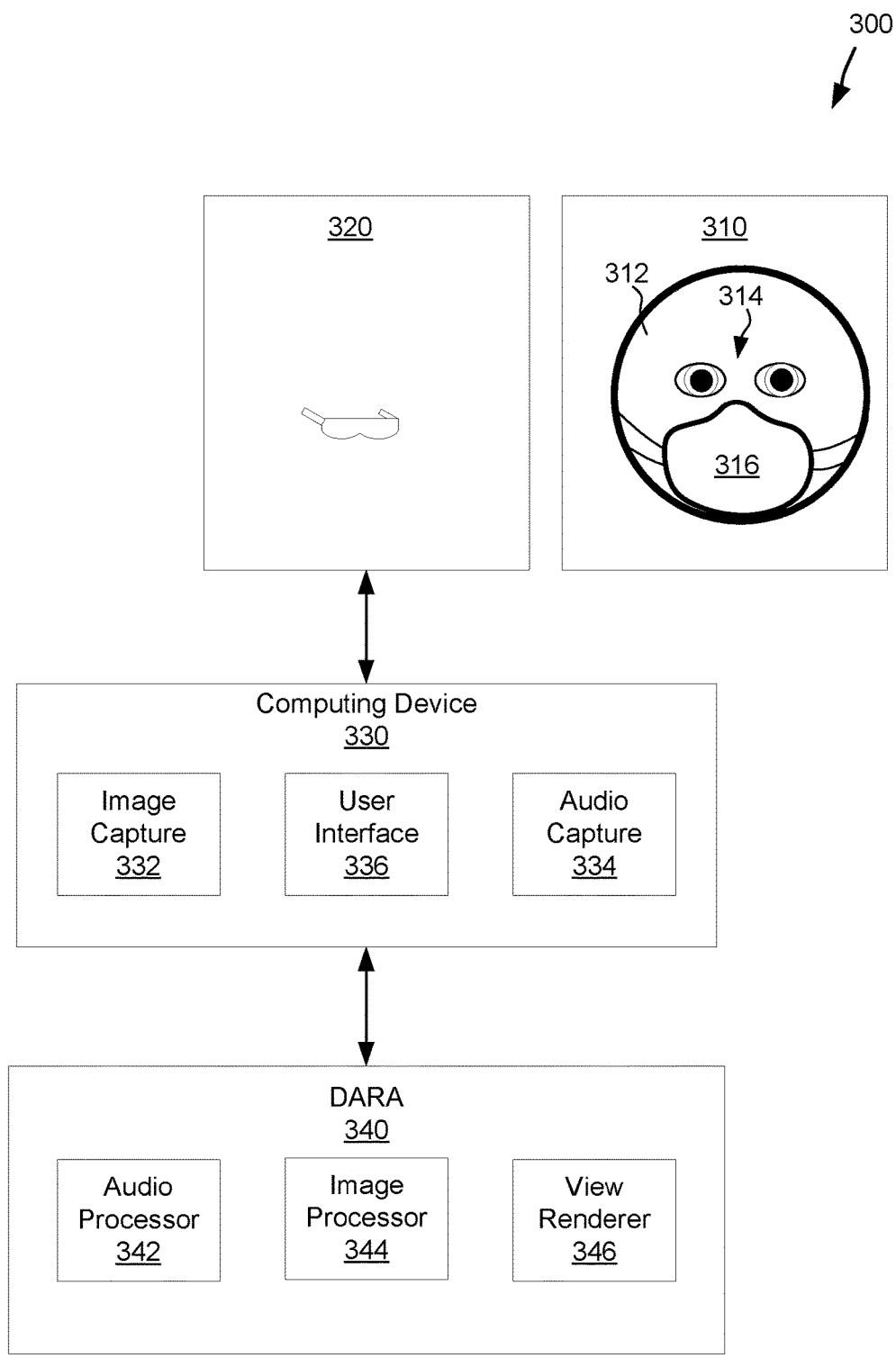
FIG. 3 depicts a system of generating an augmented view, consistent with some embodiments of the disclosure.

FIG. 3 depicts a system 300 of generating an augmented view, consistent with some embodiments of the disclosure. System 300 may operate under the control of a wearer (not depicted) and may be configured to enhance a real-world environment ("environment") 310. The environment 310 may include any scenario where a wearer may come into contact with other users (alternatively, individuals). For example, the environment 310 may be a commercial setting, such as an office building inhabited by a plurality of coworkers. In another example, environment 310 may be a residential setting, such as a park where other individuals are enjoying leisure activities. Environment 310 may include a plurality of users including user 312. User 312 may be a human being with a plurality of facial features including eyes 314. User 312 may practice social distancing and/or other measures to prevent the spread of disease. Specifically, user 312 may be wearing a mask 316.

System 300 may be configured to perform diarisation and to generate an augmented view for the wearer, that enables the wearer to communicate with users regardless of being able to see the mouth of the other users. In detail, system 300 may include the following: augmented reality glasses 320 that are configured to generate an AR view; a computing device 330 communicatively coupled to the augmented reality glasses; and a DARA 340 configured to analyze the environment 310 and generate an augmented view that includes diarized speech of users.

The augmented reality glasses 320 may be a wearable computing device. Specifically, the augmented reality glasses 320 may be a computer (e.g., computer system 100) that is designed, shaped, sized, or otherwise configured to be worn by a wearer. The augmented reality glasses 320 may include the following (not depicted): one or more lenses that are nearly transparent; a processor, and a network antenna configured to send and receive data from other computing devices. The lenses may be constructed from glass, sapphire, or other relevant transparent material. The processor of the augmented reality glasses 320 may also be capable of rendering an augmented view onto an inner surface (not depicted) of the lenses. During rendering of the augmented view, the augmented reality glasses 320 may provide a view of the environment 310, along with other relevant computer-generated information. For example, the augmented reality glasses 320 may provide relevant information such as time of day, sports scores transmitted from an Internet server, meeting and schedule information from a digital calendar, or other relevant computing information.

Computing device 330 may be a computer, such as computer system 100, configured to perform one or more operations of system 300. In some embodiments, computing device 330 may be a part of the augmented reality glasses 320. In some embodiments, computing device 330 may be a communicatively coupled additional computing device (not depicted) of the wearer. For example, computing device 330 may be a smartphone, laptop, or other device in possession of the wearer. In another example, computing device 330 may be a second wearable computing device, such as a smartwatch that is worn on the wrist of the wearer of the augmented reality glasses 320. The computing device 330 may include the following: an image capture device 332; an audio capture device 334; and a user interface 336.

The image capture device 332 may be a camera, such as a color camera affixed to a smartphone of the user. The image capture device 332 may be configured to capture a view of the environment 310. In detail, image capture device 332 may be affixed to the augmented reality glasses 320 at such a position and angle as to effectively capture a viewpoint of a wearer of the augmented reality glasses. The image capture device 332 may record a picture, series of pictures, or a video stream of the environment 310, as the user moves throughout environment, including capturing images of one or more users, including user 312.

The audio capture device 334 may be a microphone, transceiver, diaphragm, or other relevant audio recording device. The audio capture device 334 may be configured to record a stream of audio. The audio capture device 334 may be integrated into or integrally formed into the augmented reality glasses 320. In some embodiments, the audio capture device 334 may be a part of another computing device separate from the augmented reality glasses 320. For example, the audio capture device 334 may be a singular lapel microphone. In some embodiments, the audio capture device 334 may include multiple audio capture devices, configured to receive an audio stream from multiple perspectives. In detail, the audio capture device 334 may be two transceivers located near each of the ears of the user, such as an integral sub-component of wearable earbuds, over-ear headphones, hearing aids, and the like. Each transceiver may be configured to record a different perspective of the audio stream of the environment 310. For example, one transceiver may be worn in the left ear of a wearer of the augmented reality glasses 320 and may record a stream of audio from a perspective of the left side of the wearer. Continuing the example, a second transceiver may be worn in the right ear of a wearer of the augmented reality glasses 320 and may capture a stream of audio from a perspective of the right side of the wearer.

The DARA 340 of system 300 may be a computer hardware device, such as computer system 100. The DARA 340 may be a software computing construct, such as machine instructions, firmware, or predefined routines. The DARA 340 may be a portion of the computing device 330, such as a sub-routine, daemon, plug-in or other relevant computing construct. The DARA 340 may be separate from the computing device 330. For example, the computing device 330 may be a part of the augmented reality glasses 320 and the DARA 340 may be executed by a smartphone of a wearer of the augmented reality glasses 320.

The DARA 340 may include the following components: an audio processor 342 configured to process captured audio streams; an image processor 344 configured to process captures images; and a view renderer 346 configured to generate an augmented view for the augmented reality glasses 320. The DARA 340 may instruct the audio processor 342, the image processor 344, and/or the view renderer 346 to operate on or to cancel operation on a particular portion of the captured environment 310 depending on the status of a user. For example, the DARA 340 may not provide information about a particular individual in the captured environment 310 if a given individual has a mask status that the individual is not wearing a mask. In another example, the DARA 340 may not provide information about a particular individual in the captured environment 310 if a given individual has an eye contact status that the individual is not looking at the augmented reality glasses 320. The eye-contact may be a pre-determined threshold, such as eyes 314 that are directed towards the augmented reality glasses 320 for a set amount of time that is greater than ninety-five milliseconds. The pre-determined threshold may be adjusted for various situations, and customs. For example, the pre-determined threshold may be reduced when the system 300 is performing speech diarisation in a public setting around strangers. In another example, the pre-determined threshold may be increased when the system 300 is perform speech diarisation in a private setting around friends and family of the wearer.

The audio processor 342 may be configured to receive the audio stream and perform analysis on the audio stream to determine various speakers, such as user 312 in the environment 310. The audio processor 342 may identify a particular speaker or individual from within the environment 310 based on this analysis. The audio processor 342 may be configured to receive input from the other components of the DARA 340. For example, the image processor 344 may provide as output the identification and visual placement of the various individuals within the environment 310 including the user 312. The image processor 344 may also provide as output the status of each of the users. For example, the image processor 344 may provide as output a mask status that a particular user in the environment 310 is or is not wearing a mask. In a second example, the image processor 344 may provide as output an eye contact status, such as user 312 is directing the gaze of their eyes 314 towards the augmented reality glasses 320.

In some embodiments, the audio processor 342 may be configured to perform various location-based techniques on the captured audio. Specifically, the audio processor 342 may receive from a plurality of audio capture devices 334, such as a microphone array, various perspectives of an audio stream of the environment 310. The audio processor 342 may perform a triangulation, echolocation, pin-pointing, or other relevant technique to determine the particular length, depth, and height of a particular source within the environment 310, such as the speaking of a child, the crashing of a plate, the sound of music from an instrument, and the like.

In some embodiments, the audio processor 342 may be configured as a natural language processor or configured to perform one or more natural language processing techniques. For example, the audio processor 342 may analyze input from the audio capture device 334. The audio processor 342 may be a computer module that analyses the received content and other information. The audio processor 342 may perform various methods and techniques for analyzing textual information (e.g., syntactic analysis, semantic analysis, etc.). The audio processor 342 may be configured to recognize and analyze any number of natural languages. In some embodiments, the audio processor 342 may parse passages of documents or content from audio streams, such as recordings from the audio capture devices 334. Various components (not depicted) of the audio processor 342 may include, but are not limited to, a tokenizer, a part-of-speech (POS) tagger, a semantic relationship identifier, and a syntactic relationship identifier. The audio processor 342 may include a support vector machine (SVM) generator to process the content of topics found within a corpus and classify the topics.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents (e.g., transcripts of conversations between various individuals in real-world settings and/or transcripts of prior conversations between the wearer and users in the environment 310). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the audio processor 342.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the audio processor 342 may be a computer module that may parse a document and generate corresponding data structures for one or more portions of the document. For example, in response to receiving a stream of audio from the audio capture devices 334 and a stream of text converted from the stream of audio, the audio processor 342 may output parsed text elements. In some embodiments, a parsed text element may be represented in the form of a parse tree or other graph structure. To generate the parsed text element, the audio processor 342 may trigger computer modules including the tokenizer, the part-of-speech (POS) tagger, the SVM generator, the semantic relationship identifier, and the syntactic relationship identifier.

In some embodiments, the audio processor 342 may leverage one or more example machine learning techniques to perform machine-learning (ML) text operations. Specifically, audio processor 342 may be an instance of network 200 and may operate to perform machine-learning text classification and/or a machine-learning text comparison. Machine-learning text classification may include ML text operations to convert, characters, text, words, and phrases to numerical values. The numerical values may then be input into a neural network to determine various features, characteristics, and other information of words with respect to a document or in relation to other words (e.g., to classify a numerical value associated with a word may permit the classification of a word). Machine-learning text comparison may include using the numerical values of converted characters, text, words, and phrases for performing a comparison. The comparison may be a comparison of a numerical value of a first word or other text to the numerical value of a second word or other text. The determination of the machine-learning text comparison may be to determine a scoring, a correlation, or a relevant relationship (e.g., a relationship between a first numerical value of a first word and a second numerical value of a second word). The comparison may be used to determine if two words are similar or different based on one or more criteria. The numerical operations of a machine-learning text classification/comparison may be a function of a mathematical operation performed through a neural network, such as performing a linear regression, an addition, or other relevant mathematical operation of the numerical value representative of a word or other text.

The ML text operations may include word encoding, such as one-hot encoding of words from a tokenizer, POS tagger, semantic relationship identifier, syntactic relationship identifier, and the like. The ML text operations may include the use of vectorization of text, such as the vectorization of words from a tokenizer, POS tagger, semantic relationship identifier, syntactic relationship identifier, and the like. For example, a paragraph of text may include the phrase "orange is a fruit that grows on trees." Vectorization of the word "orange" may include setting input neurons of a neural network to the various words of the phrase including the word "orange." The output value may be an array of values (e.g, forty-eight numbers, thousands of numbers). The output values may trend towards "1" for related words and may trend towards "0" for unrelated words. The related words may be related based on one or more of the following: similar parts of speech, syntactical meaning, locality within a sentence or paragraph, or other relevant "closeness" between the input and other parts of natural language (e.g., other parts of the phrase "orange is a fruit that grows on trees", other parts of a paragraph that contains the phrase, other parts of language).

The image processor 344 may be a collection of hardware and software, such as an application specific integrated circuit. The image processor 344 may be configured to perform various image analysis techniques. The image analysis techniques may be machine learning and/or deep learning based techniques. These techniques may include, but are not limited to, region-based convolutional neural networks (R-CNN), you only look once (YOLO), edge matching, clustering, grayscale matching, gradient matching, invariance models, geometric hashing, scale-invariant feature transform (SIFT), speeded up robust feature (SURF), histogram of oriented gradients (HOG) features, and single shot multibox detector (SSD). For example, the image processor 344 may operate as an instance of network 200, to perform analysis on capture images from the image capture device 332.

In some embodiments, objects may be identified using an object detection algorithm, such as an R-CNN, YOLO, SSD, SIFT, Hog features, or other machine learning and/or deep learning object detection algorithms. The output of the object detection algorithm may include one or more identities of one or more respective objects with corresponding match certainties. For example, image processor 344 may be provided with an image of the environment 310 that includes user 312 from the image capture device 332 of the computing device 330. Using a relevant object detection algorithm, a face of user 312 may be identified by the image processor 344 in the image of the environment 310.

In some embodiments, features of the objects may be determined using a supervised machine learning model built using training data. For example, an image may be input into the supervised machine learning model and various classifications detected within the image can be output by the model. For example, characteristics such as object material (e.g., cloth, metal, plastic, paper etc.), shape, size, color, and other characteristics may be output by the supervised machine learning model. Further, the identification of objects (e.g., a human face, a dog, eye contact, no eye contact, obstructed mouth, unobstructed nose, mouth movement, lip movement, obscured or blurred lip movement, etc.) can be output as classifications determined by the supervised machine learning model. For example, various images of users that are wearing masks and users that are not wearing masks may be provided as input to the image processor 344. A supervised machine learning algorithm may be configured to output an identity of the object (e.g., identified individuals) as well as various characteristics of their vehicle (e.g., mask status is a first user is wearing a mask, mask status is a second user does not have a mask on, eye contact status is a third user not looking straight ahead, eye contact status is a fourth user looking towards the camera).

In some embodiments, characteristics of objects may be determined using photogrammetry techniques. For example, shapes and dimensions of objects may be approximated using photogrammetry techniques. As an example, if a user provides an image of a basket, the diameter, depth, thickness, etc. of the basket may be approximated using photogrammetry techniques. In some embodiments, characteristics of objects may be identified by referencing an ontology. For example, if an object is identified (e.g., using an R-CNN), the identity of the object may be referenced within an ontology to determine corresponding attributes of the object. The ontology may indicate attributes such as color, size, shape, use, etc. of the object.

Characteristics may include the shapes of objects, dimensions (e.g., height, length, and width) of objects, a number of objects (e.g., multiple users, a single face), colors of object, and/or other attributes of objects. In some embodiments, the output may generate a list including the identity and/or characteristics of objects (e.g., cotton shirt, metal glasses, hat, mask, earrings, etc.). In some embodiments, the output may include an indication that an identity or characteristic of an object is unknown. The indication may include a request for additional input data that can be analyzed such that the identity and/or characteristics of objects may be ascertained. For example, a source of the object may be prompted to provide features of the face such that objects in their surrounding may be recognized. In some embodiments, various objects, object attributes, and relationships between objects (e.g., hierarchical and direct relations) may be represented within a knowledge graph (KG) structure. Objects may be matched to other objects based on shared characteristics (e.g., skin-tone of a cheek of a person and skin-tone of a chin of a person, wrinkled shape of paper or cloth of a mask), relationships with other objects (e.g., an eye belongs to a face), or objects belonging to the same class (e.g., two fingers belong to the same hand of a human).

The image processor 344 may be configured to identify the various portions of an environment based on captured data. For example, image capture device 332 may provide to image processor 344 of a stream of images, such as a video feed from the environment 310. Responsive to the receipt of the stream of images, the image processor 344 may analyze the stream to identify in the image an individual, specifically individual 312 among a group of other individuals (not depicted). The image processor 344 may be configured to tag various portions of the video stream for other components of the DARA 344. For example, the image processor 344 may be configured to mark-up, tag, signify, create metadata, or otherwise create a modified version of the image that identifies the portions of the image that include the face of the user 312, the eyes 314 of the user, and the mask 316 of the user. The modified version of the image may be provided to the audio processor 342 and/or the view renderer 346.

The view renderer 346 may be a component of the DARA 340 configured to generate an augmented view that includes information of the user, such as representations of the speech of the users. The view renderer 346 may be configured to receive as input, the output of the audio processor 342 and/or the image processor 344. For example, the view renderer 346 may receive from the audio processor 342 one or more user speech elements. The user speech elements may be parsed portions of the audio stream that contain audio records, textual transcriptions, or other relevant data that represents the communication of users in the environment. Continuing the example, the view renderer 346 may receive a modified version of images processed by the image processor 344. The view renderer 346 may perform diarisation of the audio based on the user speech and the audio stream. The view renderer 346 may perform diarisation of the audio based on the modified versions of the images. The diarisation may include associating transcripts of the user speech from the audio stream with portions of the image, such as a first portion of a transcript with a first user and a second portion of a transcript with a second user. Within this process of partitioning an input audio stream, the result may be homogeneous segments of text according to various speaker entities.

The view renderer 346 may execute an instance of network 200 and may operate using one or more machine learning or artificial intelligence techniques. Specifically, the view renderer 346 may execute machine learning on data from the audio processor 342 and/or the image processor 344. For example, input neurons may be populated with output of both the audio processor 342 and the image processor 344. The view renderer 346 may execute machine learning using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The operations of the view renderer 346 may include the identification or determination of a location that is appropriate for the particular speech of a user. To select an appropriate location, the view renderer 346 may perform diarisation to identify one or more locations in the image that are associated with a speaker. The view renderer 346 may also identify one or more locations in the image that contain low-information density. Specifically, view renderer 346 may perform an image processing technique and/or a machine learning technique to identify a surface, texture, shape, or other visual portion of an image that contains relatively little information, such as a continuous or low-noise portion.

Figure 4A:
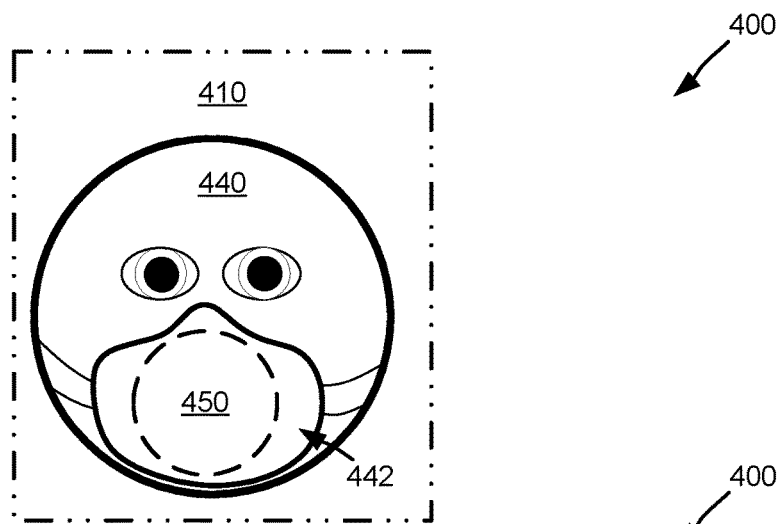
FIG. 4A depicts a first augmented view of a real-world environment, consistent with some embodiments of the disclosure.

FIG. 4A depicts a first augmented view 410 of a real-world environment 400, consistent with some embodiments of the disclosure. The first augmented view 410 may be generated by a DARA. For example, DARA 340 may generate the first augmented view 410 for a wearer of the augmented reality glasses 320 as part of system 300. The environment 400 may be an outdoor setting such as a bus-stop, but other real-world environments may be contemplated, such as a library, hospital, or home. A user 440 may be in the environment 410, and the user may be practicing effective methods to stop the spread of disease. Specifically, the user 440, may be wearing a mask 442. The DARA 340 may generate the first augmented view 410 by rendering a diarisation of speech of the user 440. For example, the DARA 340 may parse a received stream of audio from the environment 400 that includes speech of the user 440. The DARA 340 may select a portion of the environment 400 for performing diarisation, such as the mask 442 of the user 440, to generating augmented speech element 450. To a wearer of augmented reality glasses (e.g., augmented reality glasses 320) the augmented speech element 450 may appear as a bubble, circle, or floating embodiment of closed-captions or other assistive text elements that represent the speech of user 440. The augmented speech element 450 may be placed near the user 440 in a fine-grained placement or manner, such as within a degree or two of an angular placement from the face, eyes, or other relevant portion of the user 440.

Figure 4B:
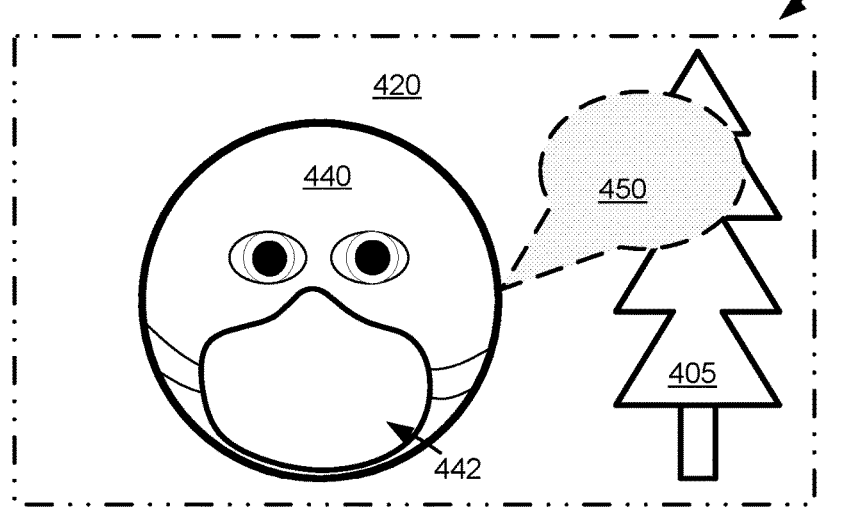
FIG. 4B depicts a second augmented view of the real-world environment, consistent with some embodiments of the disclosure.

FIG. 4B depicts a second augmented view 420 of the real-world environment 400, consistent with some embodiments of the disclosure. The second augmented view 420 may be generated by a DARA, such as DARA 340. The second augmented view 420 may be an alternative rendering of the real-world environment 400, that includes the user 440. Specifically, the user 440, may be wearing a mask 442. The DARA may generate the first augmented view 410 by rendering a diarisation of speech of the user 440. The DARA may select a portion of the environment 400 for performing diarisation that is a region of low-density information, such as background element 405 of the environment. For example, the background element 405 may be a region of the segmented augmented view 420 that includes a perspective of a tree, shrub, or other foliage or real-world feature. The rendered augmented speech element 450 of the second augmented view 420 may be shaped or sized to fit the diarized speech. For example, the augmented speech element 450 may be increased in size in the second augmented view 420 based on determining a thought, concept, or other relevant portion of the audio stream of the user 440 can be located in the augmented speech element 450. The augmented speech element 450 may be a two-dimensional shape, such as a square, circle, rectangle, or other relevant shape (e.g., a speech bubble). The DARA may select and continually adjust the size, shape, position, coloration, and text coloration of the augmented speech element 450, such as by selecting a size, shape, and color of augmented speech element 450. The adjustment of the augmented speech element 450 may be adjusted to assist in visibility and readability of the diarized text for the wearer of an augmented reality glasses.

Figure 4C:
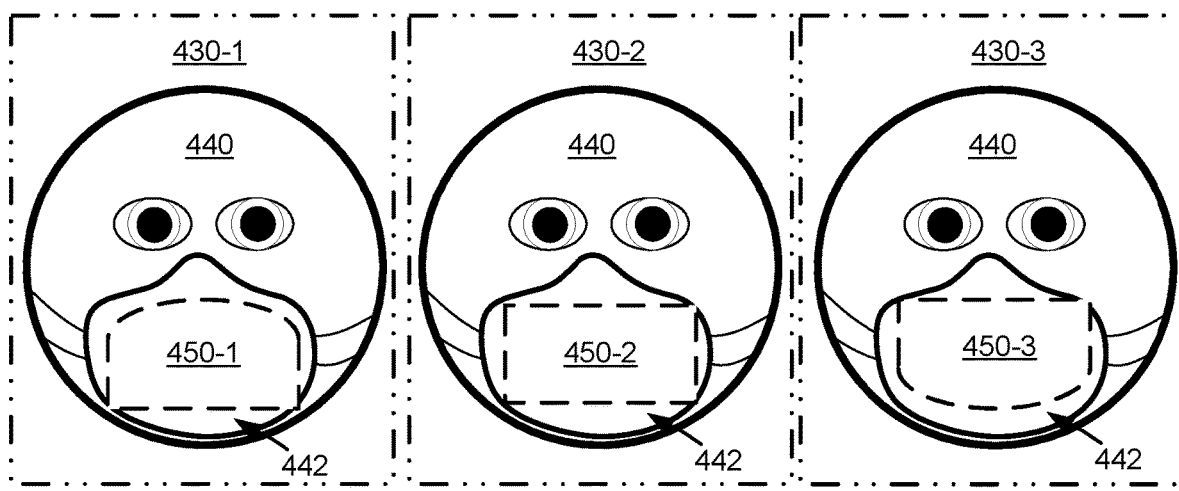
FIG. 4C depicts a plurality of augmented views of the real-world environment, consistent with some embodiments of the disclosure.

FIG. 4C depicts a plurality of augmented views 430-1, 430-2, and 430-3 (collectively, 430) of the real-world environment 400, consistent with some embodiments of the disclosure. The plurality of augmented views 430 may be generated by a DARA, such as DARA 340. The plurality of augmented views 430 may be an alternative rendering of the real-world environment 400, that includes the user 440. Specifically, the user 440, may be wearing a mask 442. The DARA 340 may generate the plurality of augmented views 430 by rendering a diarisation of speech as one or more augmented speech elements 450-1, 450-2, 450-3 (collectively, augmented speech elements 450) of the user 440. The DARA 340 may select a portion of the environment 400 for performing diarisation that is a region of low-density information, such as the mask 442 of the user 440 for placing the augmented speech elements 450. The plurality of augmented views 430 may be generated as a series of augmented views of the environment 400. Specifically, augmented view 430-1 may occur in time before augmented view 430-2, and augmented view 430-2 may occur in time before augmented view 430-3. The augmented speech elements 450 may be rendered as a series of two-dimensional shapes in the augmented views 430. For instance, augmented view 430-1 may contain augmented speech element 450-1, augmented view 430-2 may contain augmented speech element 450-2, and augmented view 430-3 may contain augmented speech element 450-3.

Each of the augmented speech elements 450 may be shaped to convey a beginning, continuation, or termination of a particular part of an audio stream, such as the speech of user 440 in the environment 400. For example, the top of augmented speech element 450-1 may be curved to indicate the beginning of a diarized portion of the audio stream from user 440. Further, the straight bottom edge of augmented speech element 450-1 may indicate a continuation of the diarized portion. Continuing the example, augmented speech element 450-2 may include flat top and to indicate a continuation of the diarized portion from that depicted by augmented speech element 450-1. Further, augmented speech element 450-2 may include a straight-edged bottom to indicate a continuation of the diarized portion. Further continuing the example, augmented speech element 450-3 may have a flat top to indicate a continuation of previous the diarized portion from augmented speech element 450-2. The augmented speech element 450-3 may have a curved bottom section to indicate the finalization of diarized portion of the audio stream from the environment 400 (e.g., the speech recognized by the DARA 340 from user 400).

The DARA may adjust the words as they are read by a wearer. For example, the wearable computing device of the wearer may be configured to perform eye-tracking and gaze-tracking of the wearer. As the wearer views the augmented views 430, the DARA may capture eye movements of the wearer, and the various augmented speech elements 450 or text therein may appear and disappear, based on the eye movement of the wearer. This may be a feedback loop, wherein based on how fast a wearer is consuming text from the augmented speech elements 450, the rate of new text that appears to the wearer may be adjusted by the DARA.

Figure 5:
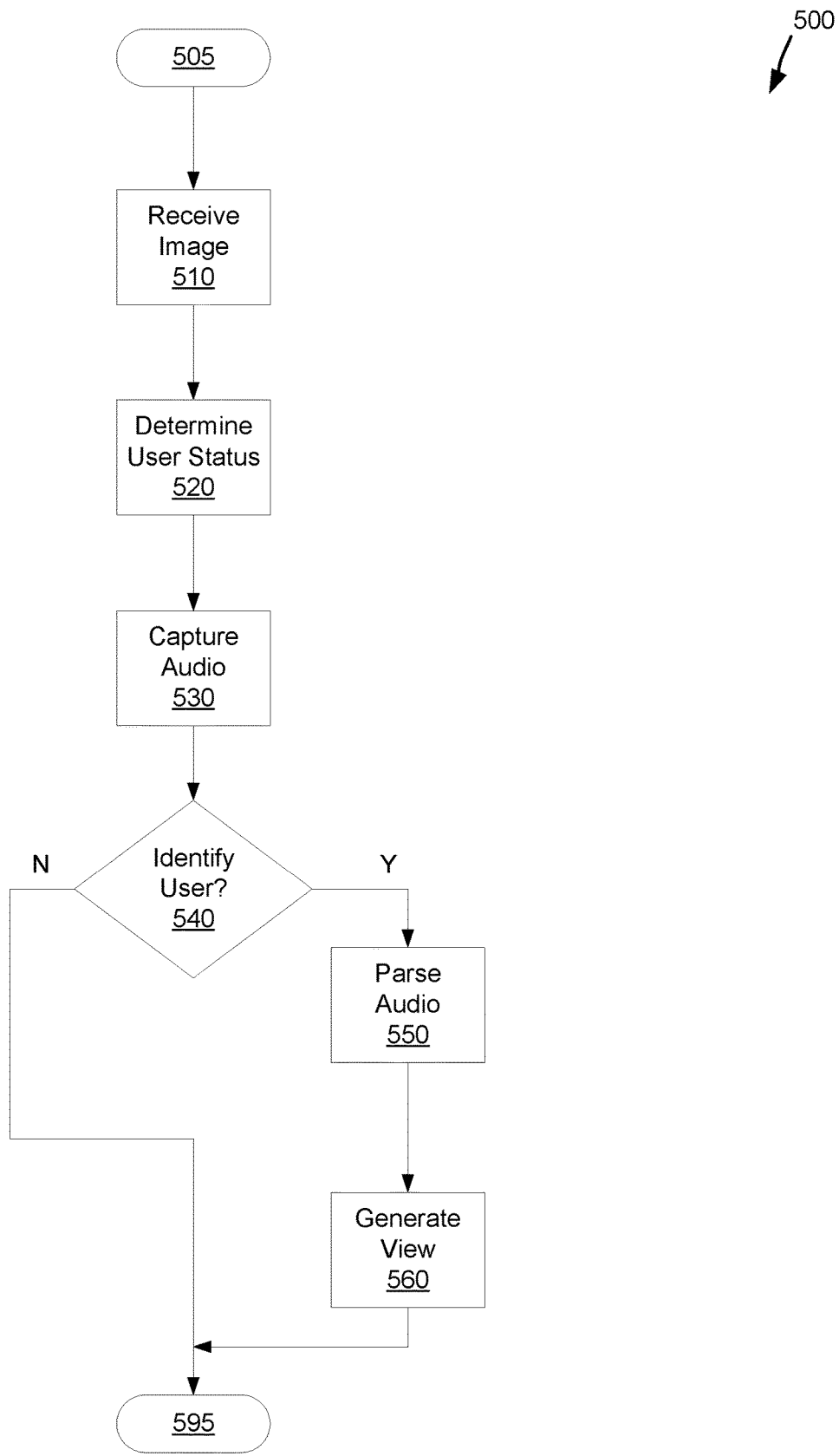
FIG. 5 depicts an example method of diarisation augmented reality aide ("DARA"), consistent with some embodiments of the disclosure.

FIG. 5 depicts an example method 500 of diarisation augmented reality aide ("DARA"), consistent with some embodiments of the disclosure. Method 500 may be performed by a processor of a computer system, such as computer 100. Method 500 may be performed by one or more computer components of a system, such as system 300. Method 500 may be performed by a wearable computing device, such as augmented reality glasses 320. The method 500 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.). Method 500 may be performed iteratively or continuously.

Method 500 may begin at 510 where an image is received. The image may be received from an image capture device, such as from a camera affixed to an augmented reality headset. The image may be of a real-world environment that includes other users—for example, an augmented reality headset worn by a patron in a restaurant that includes other patrons and employees of the restaurant.

At 520 a user status may be determined. The user status may be determined based on the received image. For example, the user status may be determined by performing an image analysis or machine learning operation on an image of the restaurant. The user status may be determining whether an individual is wearing a face covering. For example, another patron of the restaurant may be captured by the augmented reality headset and the patron may not be wearing a mask while eating. In a second example, an employee of the restaurant may be facing the wearer of the augmented reality headset and the employee may be wearing a mask. The user status may be a mask status, such as identifying a patron is not wearing a mask or identifying that an employee is wearing a mask. The user status may be determining whether an individual is looking at a wearer. For example, a first employee may be speaking while wearing a mask, but the first employee may not be looking at the wearer. A first patron may be speaking while not wearing a mask, but the first patron may be looking at the wearer.

At 530 a stream of audio may be captured. The stream of audio may be captured from a wearable computing device. For example, a stream of audio may be captured from one or more microphones affixed to a wearable augmented reality headset. The stream of audio may include speech from one or more users. For example, employees and patrons may be speaking and conversing while in a restaurant, and the stream of audio may include all of the speech from the employees and patrons.

At 540, user speech may be identified. For example, audio analysis may be performed based on the stream of audio, and speech of a first user may be identified based on the analysis. The audio may be analyzed, based on a speech recognition technique, to identify a user. The audio may be analyzed, based on a triangulation technique, to identify a user. The identification, at 540, may be based on the determined user status. For example, based on determining that a user is wearing a face covering, the audio coming from the direction of the user may be processed to identify that the user is speaking. In another example, based on determining that a user is looking at a wearer of an augmented reality headset, the audio coming from the direction of the user may be processed to identify that the user is speaking. In yet another example, based on determining that a user is wearing a face covering and based on eye contact of the same user, the audio coming from the direction of the user may be processed to identify that the user is speaking.

If a user is identified, at 540:Y, then the audio stream may be parsed at 550. In detail, the audio stream may be parsed based on an audio processing technique. The audio may be parsed, based on a machine learning technique, to create user speech elements. The audio may be parsed based on a speech diarisation technique. For example, all subsets of text that is associated with a first user may be selected from or removed from the audio stream. The subsets of text may be grouped and processed based on the intent and meaning of the speaker. The subsets of text may be parsed to create a user speech element. The user speech element may include textual representations of the speech of an identified user. For example, a wait-staff member of a restaurant may be wearing a mask and may speak a question to a wearer of augmented reality glasses. The user speech element may arrange the various words, phrases, sentences, and other parts of the question, into a logical manner of communication.

An augmented view may be generated at 560. The augmented view may be generated based on the user speech. For example, the augmented view may contain the user speech element. The augmented view may be generated based on the user status that is determined at operation 520. For example, during processing of an augmented view it may be determined both that a mask is present and a two-dimensional location of the mask within a captured image. The location may be used during generation of the augmented view, as a position for drawing diarized speech.

After the augmented view is generated at 560, or if a user is not identified at 540:N, method 500 may end at 595.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   receiving, from an image capture device, an image of a real-world environment that includes one or more users;
   determining, by a processor and based on the image, a mask status of a first user of the one or more users;
   capturing, from one or more audio transceivers, a stream of audio that includes speech from the one or more users;
   identifying, by the processor and based on the stream of audio, a first user speech from the stream of audio;
   parsing, by the processor and based on the first user speech and based on an audio processing technique, the stream of audio to create a first user speech element; and
   generating, based on the first user speech and based on the mask status, an augmented view, wherein the augmented view includes the first user speech element, wherein the augmented view is generated for a wearable computing device.

2. The method of claim 1, wherein the image capture device is affixed to the wearable computing device.

3. The method of claim 1, wherein the mask status is determined based on a machine learning technique.

4. The method of claim 1, further comprising:
   determining, by the processor and based on the image, an eye contact status of the first user and a wearer of the wearable computing device.

5. The method of claim 4, wherein the eye contact status is the first user is not looking at the wearer, and wherein the method further comprises:
   canceling, before the generating of the augmented view, the inclusion of the first user speech element.

6. The method of claim 1, wherein the identifying the first user speech is further based on the mask status.

7. The method of claim 6, wherein the identifying includes performing a machine learning technique.

8. The method of claim 7, wherein the audio transceivers includes two or more audio transceivers, and wherein identifying the first user speech includes performing a triangulation technique.

9. The method of claim 1, wherein the generating the augmented view further comprises:
   drawing, based on the first user speech element and based on the image, a two-dimensional shape at a particular location in the augmented view; and
   placing the first user speech element onto the two-dimensional shape at the particular location.

10. The method of claim 9, wherein the particular location is selected based on performing a machine learning technique on the image.

11. The method of claim 9, wherein the particular location is a portion of the image above eyes of a user that includes low-information density such that the first user speech element is located above the eyes of the user.

12. The method of claim 11, wherein the particular location is a portion of the image that includes a mask of the first user.

13. The method of claim 9, wherein the generating the augmented view further comprises:
    determining a number of words in the first user speech element; and
    adjusting, based on the number of words in the first user speech element, the size of the two-dimensional shape.

14. The method of claim 13, wherein the method further comprises:
    determining a subset of the number of words in the first user speech element is above a predetermined threshold;
    drawing, based on the first user speech element and based on the predetermined threshold, a second two-dimensional shape at the particular location in a second augmented view, the second augmented view at a second time period after the augmented view;
    placing the subset onto the second two-dimensional shape at the particular location; and
    rendering, by the wearable computing device and after the rendering the augmented view, the second augmented view into the real-world environment.

15. A system, the system comprising:
    a memory, the memory containing one or more instructions; and
    a processor, the processor communicatively coupled to the memory, the processor, in response to reading the one or more instructions, configured to:
    receive, from an image capture device, an image of a real-world environment that includes one or more users;
    determine, by a processor and based on the image, a mask status of a first user of the one or more users;
    capture, from one or more audio transceivers, a stream of audio that includes speech from the one or more users;
    identify, by the processor and based on the stream of audio, a first user speech from the stream of audio;
    parse, by the processor and based on the first user speech and based on an audio processing technique, the stream of audio to create a first user speech element; and
    generate, based on the first user speech and based on the mask status, an augmented view for an augmented reality device, wherein the augmented view includes the first user speech element, wherein the augmented view is generated for displaying by the augmented reality device.

16. The system of claim 15, wherein the image capture device is affixed to the augmented reality device.

17. The system of claim 15, wherein the mask status is determined based on a machine learning technique.

18. A computer program product, the computer program product comprising:
    one or more computer readable storage media; and program instructions collectively stored on the one or more computer readable storage media, the program instructions configured to:

receive, from an image capture device, an image of a real-world environment that includes one or more users;

determine, by a processor and based on the image, a mask status of a first user of the one or more users;

capture, from one or more audio transceivers, a stream of audio that includes speech from the one or more users;

identify, by the processor and based on the stream of audio, a first user speech from the stream of audio;

parse, by the processor and based on the first user speech and based on an audio processing technique, the stream of audio to create a plurality of user speech elements; and generate, based on the first user speech and based on the mask status, a plurality of augmented views each including a respective one of the plurality of user speech elements, wherein each of the plurality of user speech elements has a different shape to convey a different part of the first user speech, wherein the plurality of augmented views are generated for an augmented reality device.

19. The computer program product of claim 18, wherein the image capture device is affixed to the augmented reality device.

20. The computer program product of claim 18, wherein the mask status is determined based on a machine learning technique.

* * * * *